Figure 2:
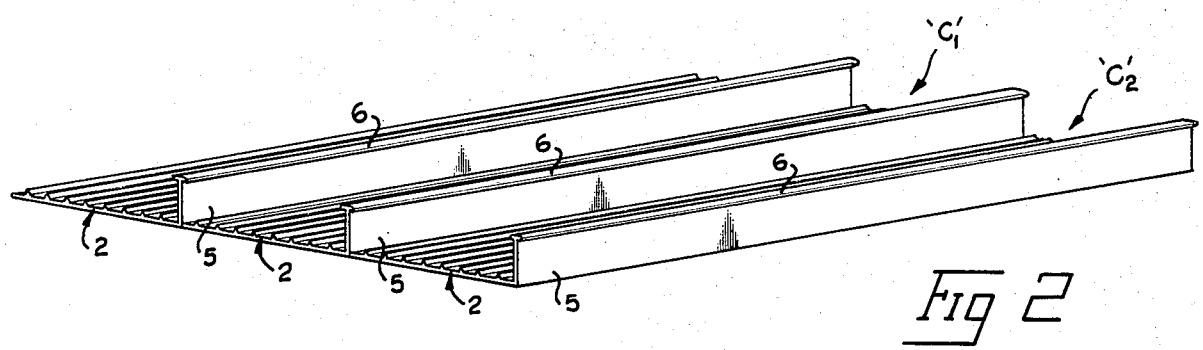

United States Patent [19]

Spamer

[11] Patent Number: 4,496,037
[45] Date of Patent: Jan. 29, 1985

[54] GRAVITY-FEED SHELF AND COMPONENTS THEREFOR

[75] Inventor: William S. Spamer, Roswell, Ga.

[73] Assignee: The Mead Corporation, Dayton, Ohio

[21] Appl. No.: 459,090

[22] Filed: Jan. 19, 1983

Related U.S. Application Data

[63] Continuation of Ser. No. 210,964, Nov. 28, 1980, abandoned.

[51] Int. Cl.³ .................................................. A47F 7/00
[52] U.S. Cl. .................................. 193/2 R; 211/49 D; 211/153; 206/561; 220/22; 220/23.4; 428/43
[58] Field of Search .................. 193/2 R, 2 C, 25 FT, 193/35 MD; 211/153, 49 D, 49 S; 428/43; 206/558, 561; 248/DIG. 9; 220/23.4, 22

[56] References Cited

U.S. PATENT DOCUMENTS

| 2,218,444 | 10/1940 | Vineyard | 193/2 X |
| 2,652,154 | 9/1953 | Stevens | 211/49 D |
| 3,559,802 | 2/1971 | Eidus | 193/35 MD X |
| 4,289,818 | 9/1981 | Casamayor | 428/43 |
| 4,364,481 | 12/1982 | Ricci | 211/184 |

FOREIGN PATENT DOCUMENTS 1405351  5/1965  France ............................ 211/49 D

*Primary Examiner*—Jeffrey V. Nase
*Attorney, Agent, or Firm*—Erwin Doerr

[57] ABSTRACT

This invention relates to a gravity-feed shelf and to low friction tracks for use in such shelves. The tracks comprise a web panel and an integral flange panel together providing an "L"-shaped structure and are characterized by a frangible zone by which a portion of the web panel can be broken away from an adjacent portion to reduce the width of the web panel, whereby the tracks readily can be adapted for use in conjunction with various sizes of packages and/or single bottles.

2 Claims, 4 Drawing Figures

U.S. Patent  Jan. 29, 1985  4,496,037

GRAVITY-FEED SHELF AND COMPONENTS THEREFOR

This application is a Continuation of U.S. patent application Ser. No. 210,964 filed Nov. 28, 1980, now abandoned.

This invention relates to gravity-feed shelves and more specifically to tracks used in such shelves. These tracks are arranged to form one or more forwardly and downwardly inclined chutes adapted to support rows of articles such as bottles or packages and facilitate the forward feeding movement of such articles with a minimum degree of friction.

Tracks of the type in question are disclosed in co-pending U.S. patent applications Ser. No. 098,876 filed Nov. 30, 1979, now U.S. Pat. No. 4,314,648 issued Feb. 9, 1982, and Ser. No. 510,495 filed July 5, 1983 as a Continuation of Ser. No. 321,993 filed Nov. 16, 1981, now abandoned, which was a Division of Ser. No. 168,951 filed July 11, 1980, now abandoned, all owned by the assignee of the present invention. While such tracks have experienced considerable success, there is a need for tracks which can be arranged in a variety of patterns to accommodate packages or bottles of various sizes.

Shelves utilizing tracks according to this invention are characterized by versatility of use, low friction, simplicity of construction and a high degree of economy in both initial and maintenance costs. According to one aspect of this invention, there is provided a track for a gravity-feed shelf, which track comprises a web panel, a flange panel integral with one side edge of said web panel and forming therewith a substantially "L"-shaped structure, a plurality of substantially parallel ribs formed on one surface of said web panel between said flange panel and the opposite side edge of said web panel, characterized in that means is provided on said web panel to form at least one frangible zone by which a portion of the web panel can be broken away from an adjacent portion to reduce the width of the web panel.

Another aspect of this invention provides a gravity-feed shelf comprising a substantially rigid support frame and including a support surface disposed in a plane which is forwardly and downwardly inclined, a plurality of elongate tracks located on said support surface, each track comprising a web panel having an undersurface in contact with said support surface and a flange panel integral with one said edge of said web panel and forming therewith a substantially "L"-shaped structure, characterized in that the flange panel of one track is located adjacent the side edge of an adjacent track remote from its flange panel, thereby providing an inclined chute formed by the flange panel of said one track and the web and flange panels of said adjacent track.

Yet another aspect of this invention provides a gravity-feed shelf comprising a substantially rigid support frame and including a support surface disposed in a plane which is forwardly and downwardly inclined, a plurality of elongate tracks located on said support surface, each track comprising a web panel having an undersurface in contact with said support surface and a flange panel integral with one side edge of said web panel and forming therewith a substantially "L"-shaped structure, characterized in that two adjacent tracks are disposed in mutually reversed orientation so that the side edge of one track remote from its flange panel is located adjacent the side edge of an adjacent track remote from its flange panel thereby providing an inclined chute formed by the flange and web panels of one track and the flange and web panels of said adjacent track.

Figure 1:
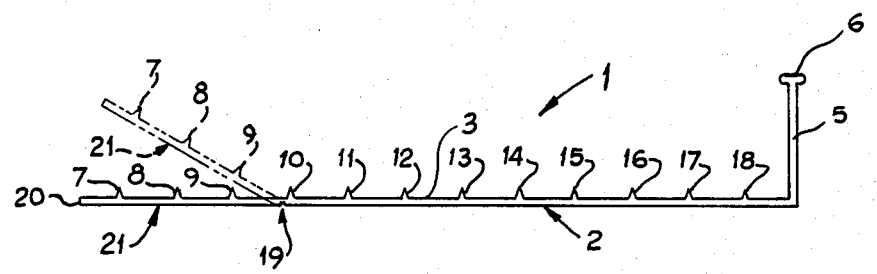
Figure 3:
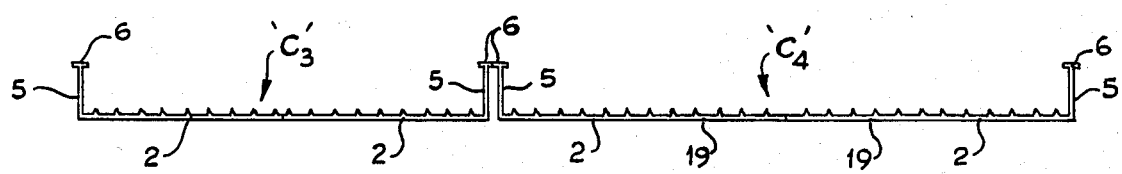
Figure 4:
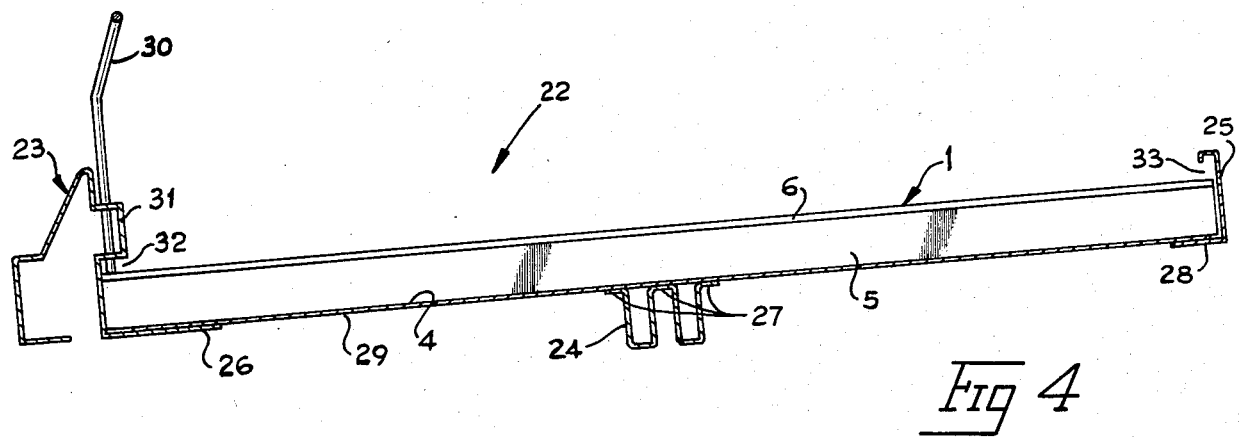

Embodiments of the invention will now be set forth by way of example and taken in conjunction with the accompanying drawings, in which:

FIG. 1 is a cross-sectional view taken through a track according to one aspect of the invention, FIG. 2 is a perspective view of a series of tracks located to give one possible arrangement of shelving chutes, FIG. 3 is a cross-sectional view of a series of tracks located to give another possible arrangement of shelving chutes, and FIG. 4 is a cross-sectional view through a display shelf incorporating tracks according to the invention.

Referring to the drawings, FIG. 1 illustrates in cross-section an elongate track 1, comprising web panel 2 having an upper surface 3 and an undersurface 4, and a flange panel 5 integral with one side edge of the web panel 2. Thus, web panel 2 and flange panel 5 together form a track having a generally "L"-shaped structure. A guide flange 6 is integrally formed at the top edge of flange panel 5 thereby giving flange panel 5 a "T"-shaped cross-sectional configuration.

For the purpose of minimizing friction between the bottles and/or packages to be accommodated on the track, a plurality of upwardly projecting parallel ribs 7–18 is integrally formed along the upper surface 3. Each of the ribs is of generally triangular cross-sectional configuration.

In order to allow the width of the web panel of track 1 to be reduced an elongate notch 19 is formed in the undersurface 4 of web panel 2 adjacent the free edge 20 of the web panel remote from flange panel 5. The notch 19 extends parallel to ribs 7–18 and is located intermediate ribs 9 and 10 thereby forming a frangible zone extending along the whole length of the web panel 2. To reduce the width of the track it is necessary simply to raise the end section 21 as shown in phantom in FIG. 1 so that end section 21 breaks away from the adjacent section of the web panel 2 along the frangible zone. End section 21 may then be discarded thereby leaving that portion of the web panel 2 having ribs 10–18. It is envisaged that the notch 19 could be formed in the upper surface 3 of web panel 2. It also is envisaged that some means other than a notch could be provided to form the frangible zone. For example, a series of perforations or scored areas could be formed in the web panel. Furthermore, in some embodiments of the invention it may be appropriate to have more than one frangible zone along the web panel so as to provide a plurality of break-away sections.

Experience has shown that the track 1 may constitute an extrusion and may be formed of polyvinyl chloride or, if desired, may be formed of high impact polystyrene material. Also, in order to provide means for reducing friction between the ribs 7–18 and the bottom of articles disposed thereon, polystyrene may have silicone or some other suitable lubricant material dispersed therein during the manufacturing process so that even though the upper surfaces of the ribs 7–18 may wear, in use, the lubricating action of the lubricant material is always effective because the structure is substantially homogeneous.

To provide a series of chutes "C1", "C2" on a display shelf two arrangements of tracks are shown, by way of example, in FIGS. 2 and 3, respectively, of the drawings. In FIG. 2 the tracks are all disposed in the same side-by-side orientation and have all had their end sections broken away and discarded. As shown, the free edge of the web panel of each track (except the extreme left hand track) is located next to the flange panel of an adjacent track. This arrangement provides a number of chutes "C" which each comprise the flange panel 5 of one track and the web and flange panels 2, 5, respectively, of an adjacent track. The arrangement is most suitable for accommodating on each chute "C1" and "C2" a row of single packages and/or bottles.

In FIG. 3 the chutes "C3" and "C4" are each formed by two tracks located side-by-side with the free edge of the web panel 2 of one track located next to the free edge of the web panel 2 of an adjacent track. In the case of chute "C3" both web panels 2 have had their end sections broken away and discarded whereas in the case of chute "C4" both web panels have their end sections intact. Chute "C3" is suitable for accommodating small multi-packs, e.g. six-packs, and chute "C4", which is of larger width, is suitable for accommodating relatively large multi-packs. Of course, any combination of the track arrangements shown in FIGS. 1 and 2 is feasible. In either arrangement, it will be appreciated that the guide flanges 6 are provided to assist in guiding articles during movement down the chutes while keeping the contact between the packages or bottles and flange panels 5 to a minimum. Also, it is not necessary to locate adjacent tracks in abutment with one another, as shown, since some small amount of spacing between adjacent tracks is permissable without impairing the low frictional relationship between the articles and the tracks.

FIG. 4 illustrates a gravity-feed shelf 22 providing part of a support frame and incorporating a series of tracks 1 arranged to provide a row of inclined chutes. Shelf 22 comprises a front support element 23, an intermediate support element 24 and a rear support element 25. The support elements 23, 24, 25 include upwardly facing support surfaces 26, 27, 28, respectively, all disposed in a common plane which is forwardly and downwardly inclined. Preferably a plannar support panel 29 is seated on support surfaces 26, 27 and 28 which provides an uninterrupted surface on which the undersurface 4 of each track, as at 1, is located. Thus, the tracks and hence the chutes are tilted downwardly toward the front end of shelf 22. It will be understood that a row of articles disposed on a chute automatically is fed in the direction of inclination of the chute upon removal of the leading article in the row. The angle of tilt from the horizontal may vary somewhat but experience has shown that this angle preferably should be between $3\frac{1}{2}°$ minimum tilt to a maximum tilt of approximately 8°. The angle of tilt or most applications of the invention should be approximately 6° from horizontal.

The front support element 23 of the shelf includes a stop member 30 comprising a wire guard which is slotted into a rearwardly protruding bead 31. When the bottles and/or packages are accommodated on the chutes located on such a shelf there is a natural tendency for those articles automatically to slide downwardly and forwardly of the shelf so that the lowermost article has its sliding movement arrested by stop member 30 and normally rests against the bead 31.

In order to locate the tracks 1 in position on a shelf it is necessary simply to flex each track and insert the opposite ends thereof into the channel shaped recesses 32, 33 provided by the front and rear support elements 23, 25, respectively. Of course, if required the tracks may be secured to the support panel 29, when present, or to support surfaces 26, 27 and 28 by suitable fastening elements or by adhesive.

What I claim is:

1. A plastic track component for a gravity feed shelf comprising a web panel having an upper article supporting surface, a flange panel integral with one side edge of said web panel and forming therewith a substantially "L"-shaped structure, a plurality of spaced ribs formed on said article supporting surface and extending the length of said web panel parallel with said flange panel, said ribs projecting upwardly from said article supporting surface and being of generally triangular cross section, an elongate notch formed in said web panel and extending parallel to and adjacent the other side edge of said web panel and remote from said flange panel and providing a frangible zone by which a portion of said web panel between said notch and said other side edge can be broken away from said web panel so as to reduce the width of said web panel, said notch extending the length of said web panel intermediate a pair of said ribs and being formed in the surface of said web panel opposite to said article supporting surface, said track component being formed of high-impact polystyrene having a lubricant material dispersed therein.

2. The track according to claim 1 further characterized in that said flange panel is of substantially "T"-shaped cross-sectional configuration.

* * * * *